United States Patent
Zhou et al.

(10) Patent No.: US 12,224,448 B2
(45) Date of Patent: Feb. 11, 2025

(54) CELL FRAME SET AND ENERGY STORAGE DEVICE PACKAGE INCLUDING CELL FRAME SET

(71) Applicant: NINGDE AMPEREX TECHNOLOGY LIMITED, Ningde (CN)

(72) Inventors: Jinbing Zhou, Ningde (CN); Xin Wang, Ningde (CN)

(73) Assignee: NINGDE AMPEREX TECHNOLOGY LIMITED, Ningde (JP)

( * ) Notice: Subject to any disclaimer, the term of this patent is extended or adjusted under 35 U.S.C. 154(b) by 442 days.

(21) Appl. No.: 17/189,100

(22) Filed: Mar. 1, 2021

(65) Prior Publication Data

US 2021/0184302 A1 Jun. 17, 2021

Related U.S. Application Data

(63) Continuation of application No. PCT/CN2020/080023, filed on Mar. 18, 2020.

(30) Foreign Application Priority Data

Sep. 29, 2019 (CN) .......................... 201910934489.2
Sep. 29, 2019 (CN) .......................... 201921651026.7

(51) Int. Cl.
*H01M 50/202* (2021.01)
*H01M 50/227* (2021.01)

(52) U.S. Cl.
CPC ....... *H01M 50/202* (2021.01); *H01M 50/227* (2021.01)

(58) Field of Classification Search
None
See application file for complete search history.

(56) References Cited

U.S. PATENT DOCUMENTS

| 6,861,821 B2 | 3/2005 | Masumoto et al. |
| 7,338,733 B2 | 4/2008 | Morita et al. |
| (Continued) | | |

FOREIGN PATENT DOCUMENTS

| CN | 202034439 U | 11/2011 |
| CN | 203562461 U | 4/2014 |
| (Continued) | | |

OTHER PUBLICATIONS

Dongguan Amperex Technology Limited, Examination Report No. 2, AU2020202292, Oct. 22, 2021, 4 pgs.

(Continued)

*Primary Examiner* — Maria Laios
*Assistant Examiner* — Jordan E Berresford
(74) *Attorney, Agent, or Firm* — XSENSUS LLP

(57) ABSTRACT

A cell frame set, including a first frame and a second frame. The first frame includes a first side edge and a second side edge opposite to the first side edge; the first side edge and the second side edge of the first frame are provided with protruding structures. The second frame includes a first side edge and a second side edge opposite to the first side edge; the first side edge and the second side edge of the second frame are provided with fitting members. The protruding structure of the first frame forms a tight fit with the fitting member of the second frame.

17 Claims, 14 Drawing Sheets

See FIG. 5B inset

(56) References Cited

U.S. PATENT DOCUMENTS

| | | | |
|---|---|---|---|
| 7,998,611 B2 * | 8/2011 | Yoshihara | H01M 50/516 |
| | | | 429/161 |
| 8,071,234 B2 | 12/2011 | Okada et al. | |
| 9,385,360 B2 * | 7/2016 | Stoughton | H01M 50/507 |
| 10,361,470 B2 | 7/2019 | Kwon et al. | |
| 2008/0160395 A1 | 7/2008 | Okada et al. | |
| 2012/0212664 A1 | 8/2012 | Hou et al. | |
| 2013/0224524 A1 | 8/2013 | Nam et al. | |
| 2015/0050525 A1 | 2/2015 | Ahn | |
| 2015/0380697 A1 * | 12/2015 | Osborne | H01M 50/502 |
| | | | 429/153 |
| 2016/0133997 A1 | 5/2016 | Vejalla et al. | |
| 2017/0110700 A1 | 4/2017 | Nishimura et al. | |
| 2017/0301905 A1 | 10/2017 | Takeda et al. | |
| 2018/0034121 A1 | 2/2018 | Kwon et al. | |
| 2018/0145294 A1 | 5/2018 | Choi et al. | |
| 2020/0243811 A1 * | 7/2020 | Park | H01M 10/425 |
| 2020/0251768 A1 * | 8/2020 | Tajima | H01M 10/0481 |

FOREIGN PATENT DOCUMENTS

| | | | | |
|---|---|---|---|---|
| CN | 104610740 A | 5/2015 | | |
| CN | 206236730 U | 6/2017 | | |
| CN | 107431157 A | 12/2017 | | |
| CN | 206758526 U | 12/2017 | | |
| CN | 207009493 U | 2/2018 | | |
| CN | 207097918 U | 3/2018 | | |
| CN | 107994160 A | 5/2018 | | |
| CN | 207320191 U | 5/2018 | | |
| CN | 207800679 U | 8/2018 | | |
| CN | 208127284 U | 11/2018 | | |
| CN | 109309182 A | 2/2019 | | |
| CN | 208889743 U | 5/2019 | | |
| CN | 109904378 A | 6/2019 | | |
| CN | 109962186 A | * | 7/2019 | H01M 50/20 |
| CN | 209104240 U | 7/2019 | | |
| CN | 110233229 A | 9/2019 | | |
| CN | 209418572 U | 9/2019 | | |
| CN | 110739422 A | 1/2020 | | |
| CN | 211350711 U | 8/2020 | | |
| DE | 102014013410 A1 | 3/2016 | | |
| JP | S58104159 A | 6/1983 | | |
| JP | 2005116456 A | 4/2005 | | |
| JP | 2011243442 A | 12/2011 | | |
| JP | 2012155148 A | 8/2012 | | |
| WO | WO-2017221536 A1 | * | 12/2017 | H01M 2/02 |
| WO | 2019056269 A1 | 3/2019 | | |

OTHER PUBLICATIONS

Dongguan Amperex Technology Limited, Examination Report, AU2020202292, May 10, 2021, 6 pgs.

Dongguan Amperex Technology Limited, International Search Report and Written Opinion, PCT/CN2020/080023, Jun. 22, 2020, 17 pgs.

Dongguan Amperex Technology Limited, Notice of Reasons for Refusal, JP2020518545, Mar. 25, 2022, 10 pgs.

Dongguan Amperex Technology Limited, Notice of Reasons for Refusal, JP2020518545, Oct. 18, 2022, 6 pgs.

Office Action, CN201910934489.2, Dec. 29, 2023, 9 pgs.

Supplementary European Search Report mailed Jun. 26, 2024, in European Application No. 20712435.5, 12 pages.

Notice of registration and Notification of grant of patent right for invention mailed Jun. 10, 2024, in Chinese Application No. 201910934489.2, 11 pages. (with English Translation).

* cited by examiner

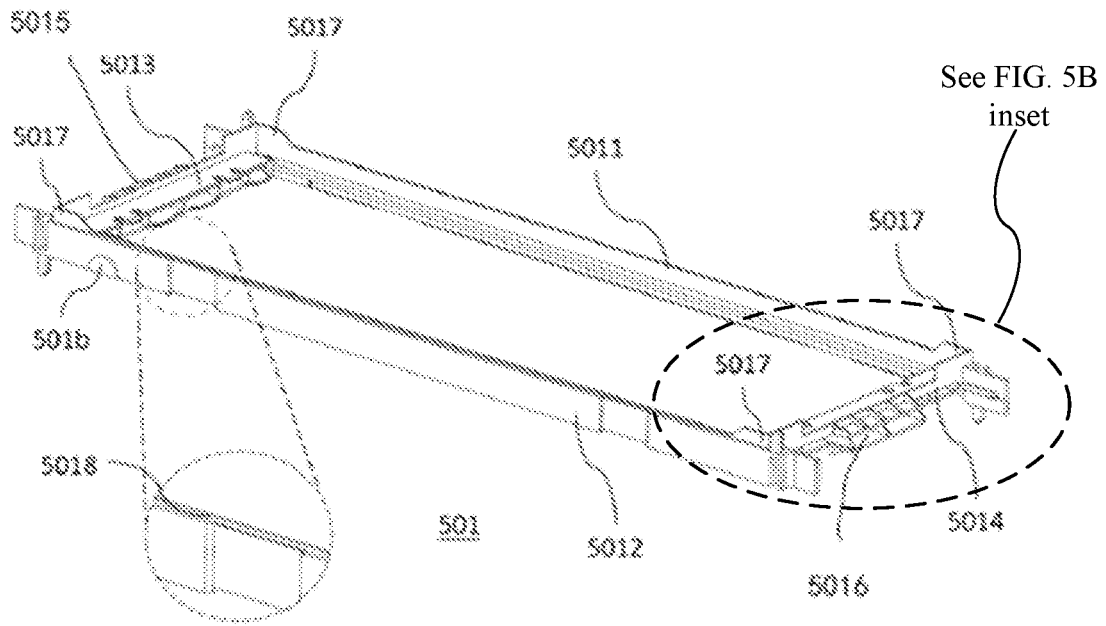
FIG. 5B
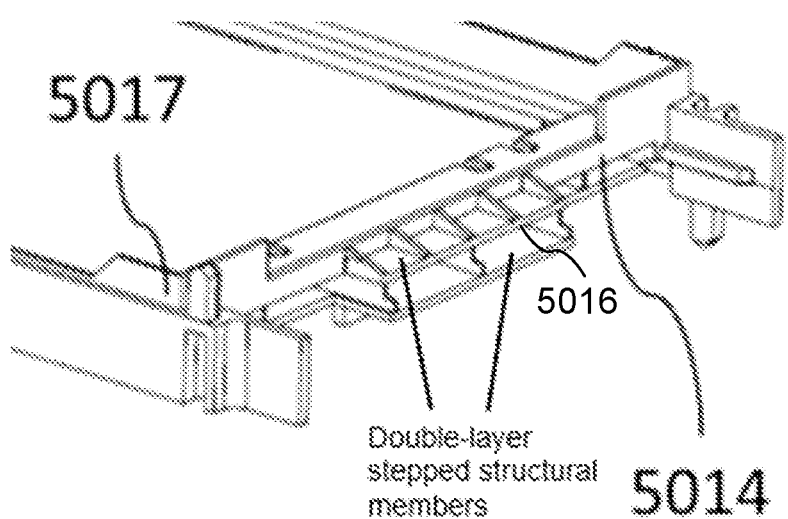
FIG. 5B inset

CELL FRAME SET AND ENERGY STORAGE DEVICE PACKAGE INCLUDING CELL FRAME SET

CROSS REFERENCE TO THE RELATED APPLICATIONS

This application is a continuation application of PCT Patent Application No. PCT/CN2020/080023, filed on Mar. 18, 2020, which claims priority to Chinese Patent Application No. 201910934489.2, filed with the State Intellectual Property Office of the People's Republic of China on Sep. 29, 2019, and Chinese Patent Application No. 201921651026.7, filed with the State Intellectual Property Office of the People's Republic of China on Sep. 29, 2019, all of which are incorporated herein by reference in their entirety.

TECHNICAL FIELD

The present application relates to the technical field of energy storage, and in particular to a cell frame set and an energy storage device package including the cell frame set.

DESCRIPTION OF THE RELATED ART

An energy storage device needs to be provided with a package to be protected, and the package has protective and dust-proof functions on the energy storage device. In addition, due to the application and development of the energy storage device in different environments, the demand for its safety performance has also increased. The package needs to protect the energy storage device from external force impact and puncture. The package also needs to reduce the environmental influence on the energy storage device. Existing packages are mainly metal plates and aluminum extrusion metal housings, and the main body of most of the packages is spliced from 4 aluminum plates. The above-mentioned packages are often too heavy and lack a heat dissipation structure, causing defects including high production cost, low strength, poor heat dissipation, difficulty in assembly and vulnerable to damage during transportation.

Therefore, the package structure of the energy storage device still needs to be further improved to enhance the safety performance and heat dissipation performance of the energy storage device.

SUMMARY OF THE INVENTION

The present application provides a cell frame set and an energy storage device package including the cell frame set in an attempt to solve at least one problem in the related field at least to some extent.

According to one aspect of the present application, the present application provides a cell frame set. The cell frame set includes: a first frame, the first frame having a first side edge and a second side edge opposite to the first side edge, wherein the first side edge and the second side edge of the first frame are provided with protruding structures; and a second frame, the second frame having a first side edge and a second side edge opposite to the first side edge, wherein the first side edge and the second side edge of the second frame are provided with fitting members, wherein the protruding structure of the first frame forms a tight fit with the fitting member of the second frame.

According to one aspect of the present application, wherein the first frame further comprises a third side edge and a fourth side edge opposite to the third side edge, the first frame is provided with a first baffle plate at the third side edge, and the first frame is provided with a second baffle plate at the fourth side edge.

According to one aspect of the present application, wherein the first baffle plate and the second baffle plate are double-layer stepped structural members.

According to one aspect of the present application, the first frame further comprises a third side edge and a fourth side edge opposite to the third side edge, wherein the first frame is provided with convex members at intersections of the first side edge with the third side edge and the fourth side edge, and at intersections of the second side edge with the third side edge and the fourth side edge.

According to one aspect of the present application, the present application provides a cell frame set. The cell frame set includes a first frame, a second frame and at least one intermediate frame. The first frame having a first side edge and a second side edge opposite to the first side edge, wherein the first side edge and the second side edge of the first frame are provided with protruding structures. The second frame having a first side edge and a second side edge opposite to the first side edge, wherein the first side edge and the second side edge of the second frame are provided with fitting members. at least one intermediate frame disposed between first frame and a second frame, each intermediate frame having a first side edge and a second side edge opposite to the first side edge, wherein the first side edge and the second side edge of the each intermediate frame are provided with a protruding structure and a fitting member corresponding to the protruding structure. The protruding structure of one intermediate frame forms a fit with the fitting member of the second frame, the fitting member of the one intermediate frame or another intermediate frame forms a fit with the protruding structure of the first frame.

According to one aspect of the present application, wherein the at least one intermediate frame includes a plurality of intermediate frames, wherein adjacent intermediate frames are connected by fitting the protruding structures and convex members of one intermediate frame with the fitting member of an adjacent intermediate frame.

According to one aspect of the present application, wherein the first side edge of the intermediate frame is correspondingly combined with the second side edge of the adjacent intermediate frame.

According to one aspect of the present application, wherein the first frame further has a third side edge and a fourth side edge opposite to the third side edge, the first frame is provided with a first baffle plate at the third side edge, and the first frame is provided with a second baffle plate at the fourth side edge.

According to one aspect of the present application, wherein the first side edge of the intermediate frame is correspondingly combined with the second side edge of the adjacent intermediate frame.

According to one aspect of the present application, wherein the first frame is provided with the convex members at intersections of the first side edge with the third side edge and the fourth side edge, and the first frame is provided with the convex members at intersections of the second side edge with the third side edge and the fourth side edge.

According to one aspect of the present application, wherein a first surface of the first side edge of the intermediate frame is coplanar with a first surface of the second side edge of the adjacent intermediate frame, and a first surface of a tightly fitted portion of the intermediate frame is coplanar with the first surface of the first side edge of the intermediate frame.

According to one aspect of the present application, wherein the first side edge of the intermediate frame comprises a first pattern on a first surface, and the second side edge of the intermediate frame comprises a second pattern on a first surface, wherein the first pattern and the second pattern have a fool-proof function.

According to one aspect of the present application, the present application provides an energy storage device package, which comprises cell frame set according to an embodiment of the present disclosure, and the energy storage device package comprising a fixing steel strip and a package housing.

According to one or more embodiments, by providing the cell frame set and the energy storage device package including the same, the energy storage device package of the present application can effectively reduce the weight of the energy storage device and enhance its heat dissipation efficiency while maintaining its structural strength and protection performance, and can reduce the production cost and enhance assembly and transportation efficiency.

Additional aspects and advantages of the embodiments of the present application will be described or shown in the following description or interpreted by implementing the embodiments of the present application.

BRIEF DESCRIPTION OF THE DRAWINGS

The following will briefly illustrate the accompanying drawings. Drawings necessary to describe the embodiments of the present application or the prior art will be briefly illustrated so as to facilitate the description of the embodiments of the present application. Obviously, the accompanying drawings described below only show some embodiments of the present application. For those skilled in the art, the drawings of other embodiments can still be obtained according to the structures illustrated in the drawings without any creative effort.

FIG. 5B is a schematic structural view of an intermediate frame according to some embodiments of the present application.

DETAILED DESCRIPTION

Figure 1:
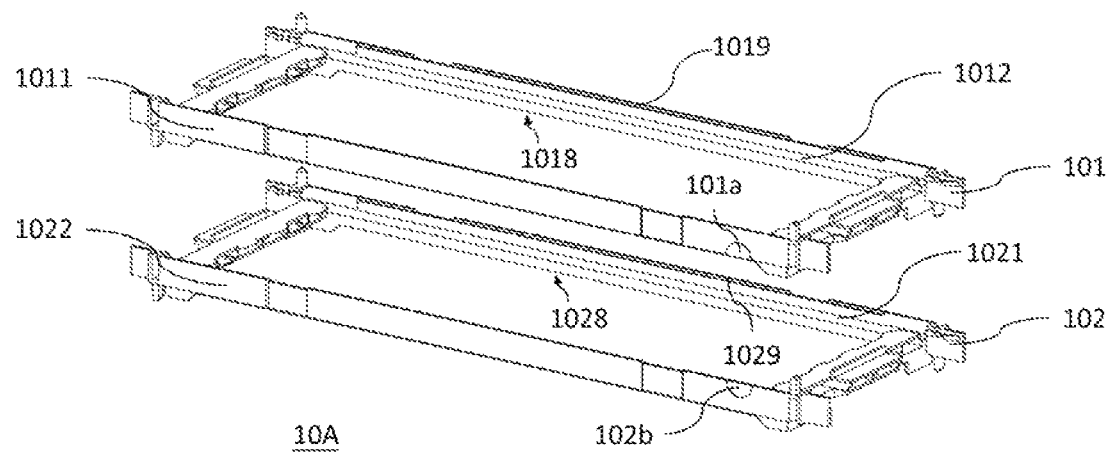
FIG. 1 is a schematic combined structural view of a cell frame set according to some embodiments of the present application.

The embodiments of the present application will be described in detail below. Throughout the specification, the same or similar components and components having the same or similar functions are denoted by similar reference numerals. The embodiments described herein with respect to the drawings are illustrative and graphical, and are used for providing a basic understanding of the present application. The embodiments of the present application should not be interpreted as limitations to the present application.

An energy storage device often needs to be provided with a package to enhance the internal structural stability of the energy storage device, but at the same time, this will cause the heat dissipation effect of the energy storage device to deteriorate, which easily causes the energy storage device to leak due to too much heat during charging and discharging, and even causes safety problems such as fire disasters. In addition, the energy storage device package also has the problem of being too large and heavy, thereby causing difficulty in assembly and transportation and influencing the needs of its environmental impact.

The structures and beneficial effects of the cell frame set and the energy storage device package provided by the embodiments of the present application will be described below in conjunction with the accompanying drawings.

According to one aspect of the present application, the present application provides a cell frame set. The cell frame set can effectively reduce the weight of the frames while maintaining the structural strength of the frames, and enhance the heat dissipation efficiency of the cell covered thereby.

FIG. 1 illustrates a schematic structural view of a cell frame set according to some embodiments of the present application.

As shown in FIG. 1, the cell frame set 10A may include: a first frame 101 and a second frame 102. The first frame 101 has a first side edge 1011 and a second side edge 1012. The second frame 102 has a first side edge 1021 and a second side edge 1022 opposite to the first side edge. The first side edge 1011 of the first frame 101 corresponds to the second side edge 1022 of the second frame 102. A space is formed between the first frame 101 and the second frame 102.

In some embodiments, the first side edge 1011 of the first frame 101 is correspondingly combined with the second side edge 1022 of the second frame 102. Equivalently, the second side edge 1012 of the first frame 101 is correspondingly combined with the first side edge 1021 of the second frame 102. In other embodiments, the first side edge 1011 of the first frame 101 is correspondingly combined with the first side edge 1021 of the second frame 102. Equivalently, the second side edge 1012 of the first frame 101 is correspondingly combined with the second side edge 1022 of the second frame 102.

A space for storing a cell can be formed between the first frame 101 and the second frame 102. In some embodiments, the first frame 101 and the second frame 102 have a hollow design in the middle, so that the cell frame set can enhance the heat dissipation rate of the cell disposed therein more efficiently.

Figure 2:
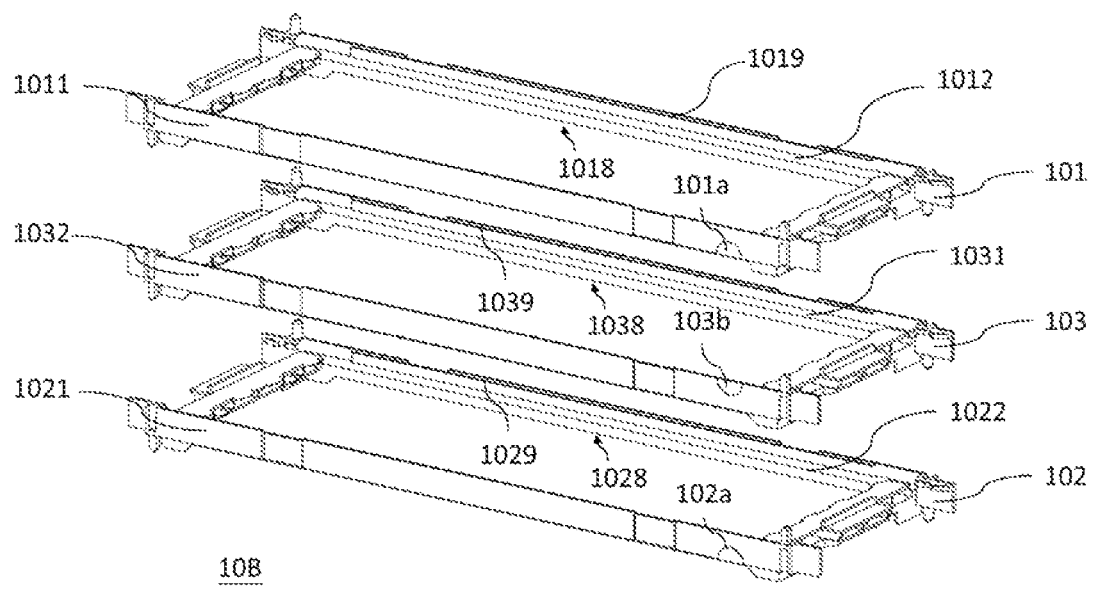
FIG. 2 is a schematic combined structural view of a cell frame set according to other embodiments of the present application.

FIG. 2 illustrates a schematic structural view of a cell frame set according to some embodiments of the present application.

As shown in FIG. 2, the cell frame set 10B includes a first frame 101, a second frame 102 and an intermediate frame 103. The intermediate frame 103 has a first side edge 1031 and a second side edge 1032 opposite to the first side edge. The first frame 101 may be correspondingly combined with the second side edge 1032 of the intermediate frame 103 through the first side edge 1011 thereof. The first frame 101 may be correspondingly combined with the first side edge 1031 of the intermediate frame 103 through the second side edge 1012 thereof.

A space for storing a cell can be formed between the first frame 101 and the intermediate frame 103. A space for storing a cell can be formed between the second frame 102 and the intermediate frame 103.

In some embodiments, the first frame 101, the intermediate frame 103 and the second frame 102 are combined in a manner of horizontally rotating by 180 degrees, so as to adjust the connection direction and sequence of cell tabs such that they are connected in series.

It should be understood that those skilled in the art can adjust the method of combining the first frame 101, the intermediate frame 103 and the second frame 102 according to the specific cell connection manner without being limited thereto. For example, the first frame 101 may be stacked and combined with the intermediate frame 103 in a same direction. In some embodiments, the first frame 101 may be correspondingly combined with the first side edge 1031 of the intermediate frame 103 through the first side edge 1011 thereof. In some embodiments, the second frame 102 may be correspondingly combined with the first side edge 1031 of the intermediate frame 103 through the first side edge 1021 thereof.

In some embodiments, a gasket (not shown) may be further disposed between the space formed between the first frame 101 and the intermediate frame 103 and the space formed between the intermediate frame 103 and the second frame 102, so as to more completely isolate the cells disposed in the two spaces.

Figure 3:
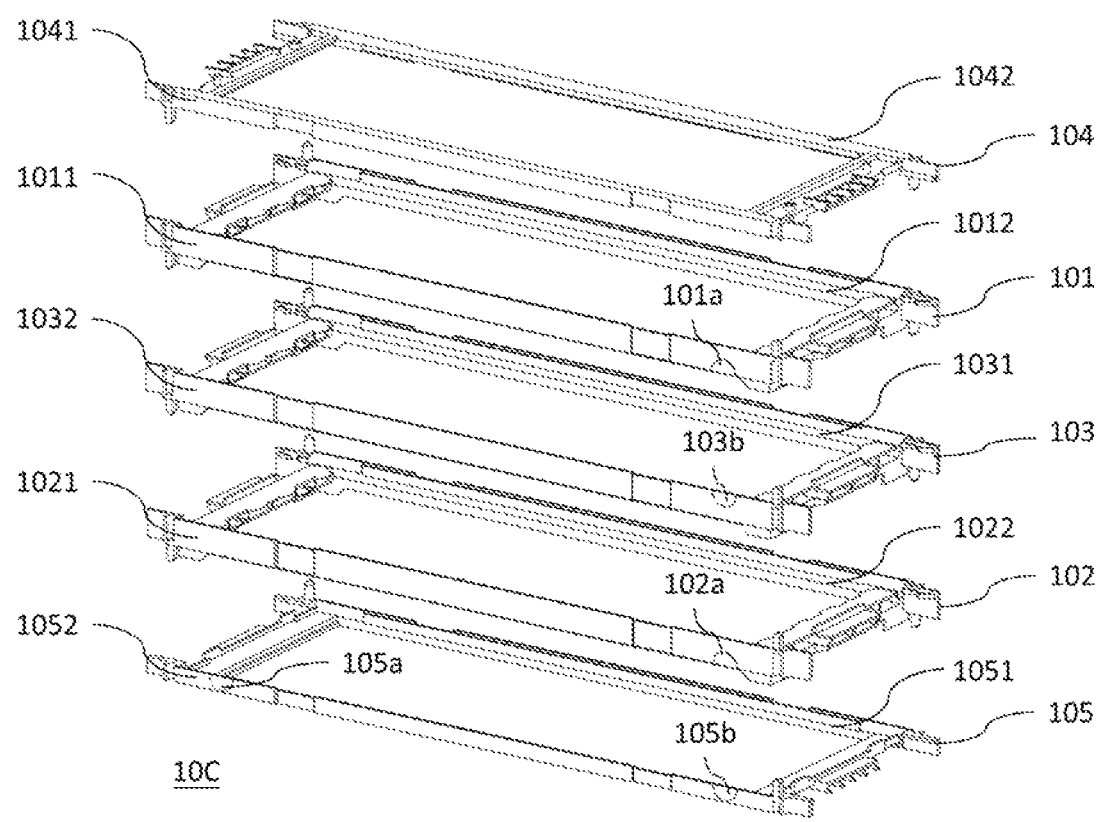
FIG. 3 is a schematic combined structural view of a cell frame set according to other embodiments of the present application.

According to other embodiments of the present application, the cell frame set of the present application may further include end frames disposed at two ends. FIG. 3 illustrates a schematic structural view of a cell frame set according to other embodiments of the present application.

As shown in FIG. 3, the cell frame set 10C includes a first end frame 104, a first frame 101, an intermediate frame 103, a second frame 102 and a second end frame 105. The first end frame 104 has a first side edge 1041 and a second side edge 1042 opposite to the first side edge. The first end frame 104 is correspondingly combined with a first side edge 1011 and a second side edge 1012 of the first frame through the first side edge 1041 and the second side edge 1042 thereof.

A space for storing a cell can be formed between the first end frame 104 and the first frame 101 and between the second end frame 105 and the second frame 102.

In some embodiments, the first end frame 104 and the second end frame 105 have a same shape. It should be understood that those skilled in the art can adjust the method of combining the first end frame 104, the first frame 101, the intermediate frame 103, the second frame 102 and the second end frame 105 with each other according to the specific cell connection manner without being limited thereto.

Figure 4:
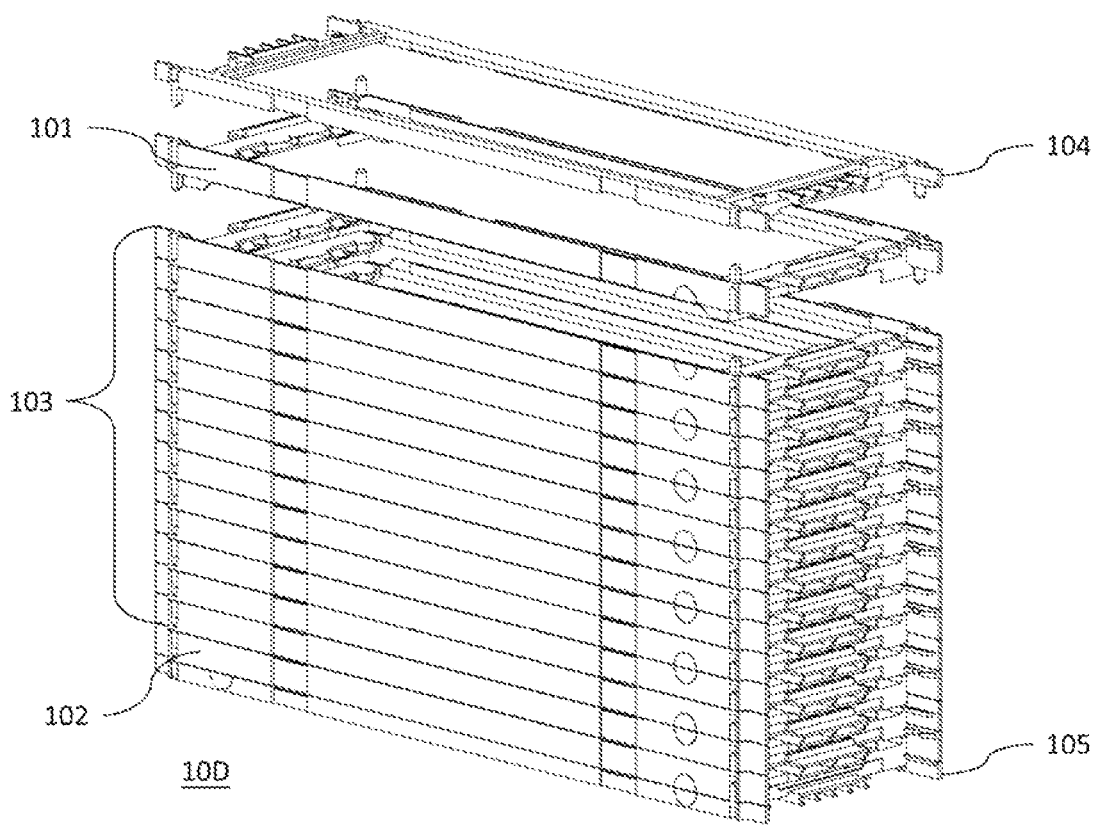
FIG. 4 is a schematic combined structural view of a cell frame set according to other embodiments of the present application.

FIG. 4 illustrates a schematic structural combined view of a cell frame set according to some embodiments of the present application.

As shown in FIG. 4, the cell frame set 10D includes a first end frame 104, a first frame 101, a plurality of intermediate frames 103, a second frame 102 and a second end frame 105. The intermediate frame 103 may be correspondingly combined with a second side edge 1032 of another adjacent intermediate frame through a first side edge 1031 thereof. A space for storing a cell can be formed between the intermediate frame 103 and another adjacent intermediate frame.

In some embodiments, the plurality of intermediate frames are combined with each other in a manner of sequentially horizontally rotating by 180 degrees, so as to adjust the connection direction and sequence of cell tabs such that they are connected in series. It should be understood that those skilled in the art can adjust the method of combining the plurality of intermediate frames with each other according to the specific cell connection manner without being limited thereto.

In some embodiments, a gasket (not shown) may be further disposed between the spaces between the plurality of intermediate frames 103, so as to more completely isolate the cells disposed in the two separate spaces.

Figure 5A:
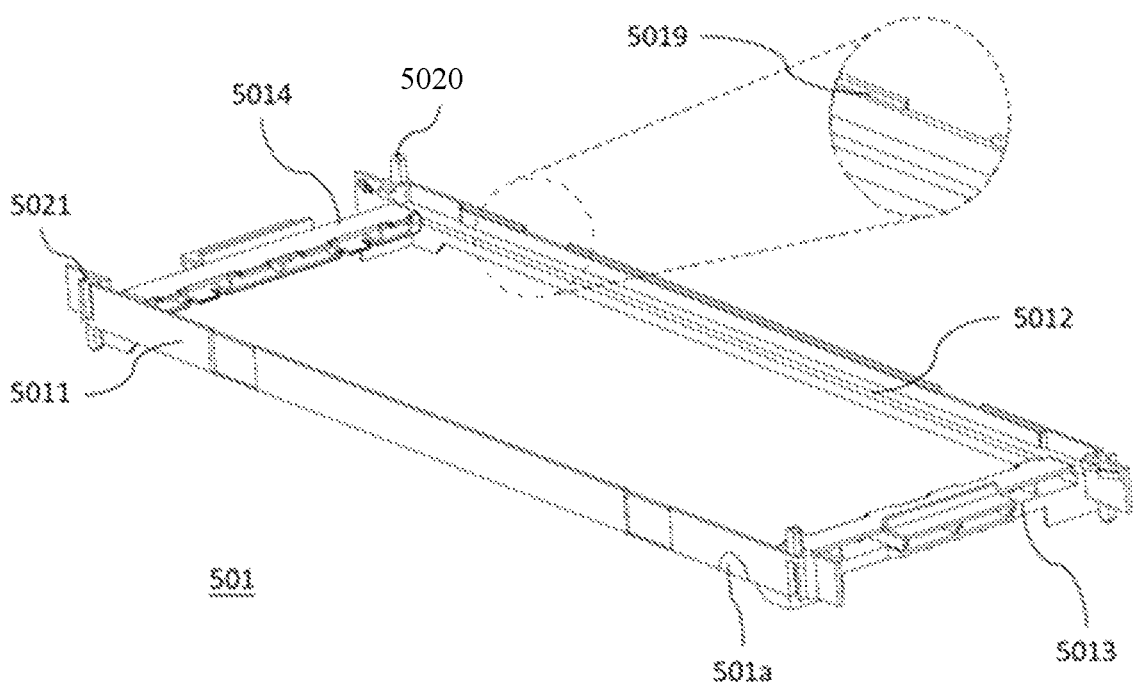
FIG. 5A is a schematic structural view of an intermediate frame according to some embodiments of the present application.

According to some embodiments of the present application, the first frame 101, the intermediate frame 103 and the second frame 102 have the same structural shape. FIG. 5A and FIG. 5B are structural views of a first frame, a second frame and an intermediate frame according to some embodiments of the present application.

As shown in FIG. 5A and FIG. 5B, the intermediate frame 501 (or the first frame or the second frame) has a first side edge 5011 and a second side edge 5012 opposite to the first side edge. The first side edge 5011 and the second side edge 5012 of the intermediate frame 501 are provided with protruding structures 5018 and fitting members 5019. The protruding structure 5018 and the fitting member 5019 are respectively disposed on two opposite surfaces, the protruding structure 5018 is closer to the inside of the frame than the fitting member 5019 in horizontal positions, and their positions are staggered and corresponding to each other.

Figure 5C:
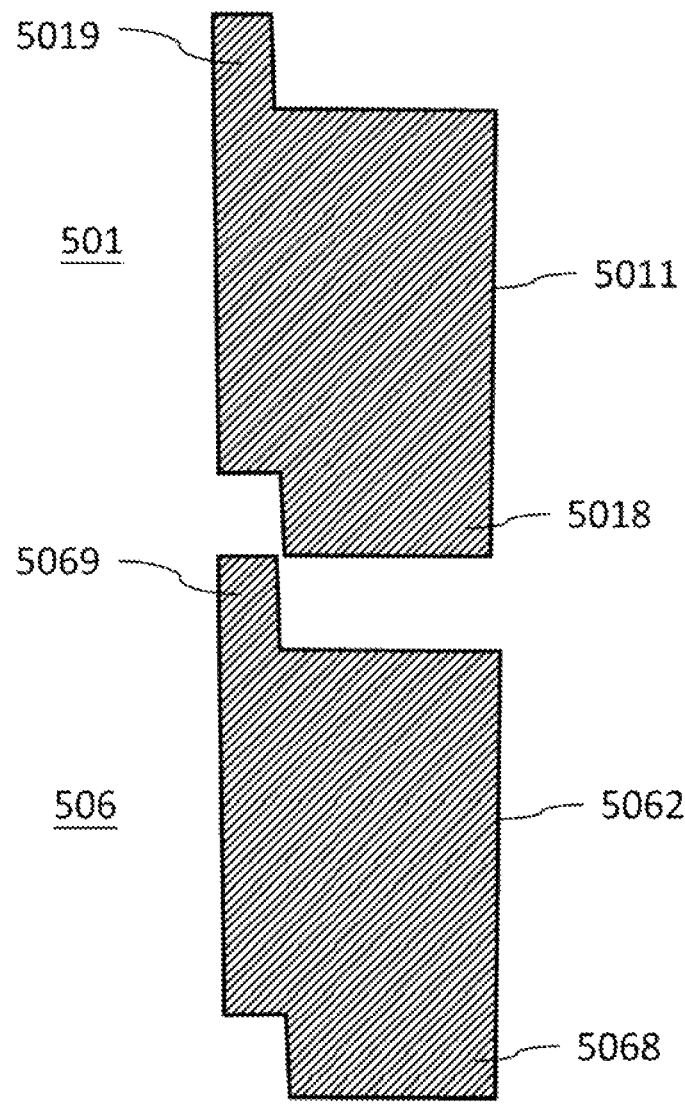
FIG. 5C is a schematic structural cross-sectional view of an intermediate frame according to some embodiments of the present application.

FIG. 5C is a schematic enlarged cross-sectional view of a partial structure of an intermediate frame according to some embodiments of the present application.

As shown in FIG. 5C, the first side edge 5011 of the intermediate frame 501 includes the protruding structure 5018 and the fitting member 5019, and a second side edge 5062 of an adjacent intermediate frame 506 includes a protruding structure 5068 and a fitting member 5069. After the cell frame set is assembled, when a certain pressure is applied for fixation, the protruding structure 5018 of the intermediate frame 501 forms a tight fit with the fitting member 5069 of the adjacent intermediate frame 506, so that two sides of the intermediate frame achieves a seamless joint that cannot be distinguished by the naked eye. In the assembly process, the tightly fitted portion of the intermediate frame 501 and the adjacent intermediate frame 506 can prevent the side edges of the cell frame set from being squeezed and offset, thereby enhancing the assembly yield and the stability of the cell frame set. The tightly fitted portion can prevent dust from entering the cell frame set. The tightly fitted portion may enhance the dust-proof effect of the cell frame set.

In some embodiments, the intermediate frame 501, the adjacent intermediate frame 506 and the fitted portion can form a flat surface. A first surface of the first side edge 5011 of the intermediate frame 501 is substantially coplanar with a first surface of the second side edge 5062 of the adjacent intermediate frame 506, and a first surface of the tightly fitted portion of the intermediate frame 501 with the adjacent intermediate frame 506 is substantially coplanar with the first surface of the first side edge 5011 of the intermediate frame 501.

With reference to FIG. 1, the first side edge 1011 and the second side edge 1012 of the first frame 101 are provided with protruding structures 1018 and fitting members 1019, and the first side edge 1021 and the second side edge 1022 of the second frame 102 are also provided with protruding structures 1028 and fitting members 1029, wherein the protruding structure 1018 of the first frame 101 corresponds to the fitting member 1029 of the second frame 102. When the first frame 101 and the second frame 102 are combined, the protruding structure and the fitting member corresponding to each other can form a tightly fitted portion. The tightly fitted portion can enhance the combining force of the first frame 101 and the second frame 102.

With reference to FIG. 2, the first side edge 1031 and the second side edge 1032 of the intermediate frame 103 are provided with protruding structures 1038 and fitting members 1039, wherein the protruding structure 1018 of the first frame 101 corresponds to the fitting member 1039 of the intermediate frame 103, and the protruding structure 1038 of the intermediate frame 103 corresponds to the fitting member 1029 of the second frame 102. When the first frame 101, the intermediate frame 103 and the second frame 102 are combined, the protruding structure and the fitting member corresponding to each other can form a tightly fitted portion. The tightly fitted portion can enhance the combining force of the first frame 101, the intermediate frame and the second frame 102.

Figure 5D:
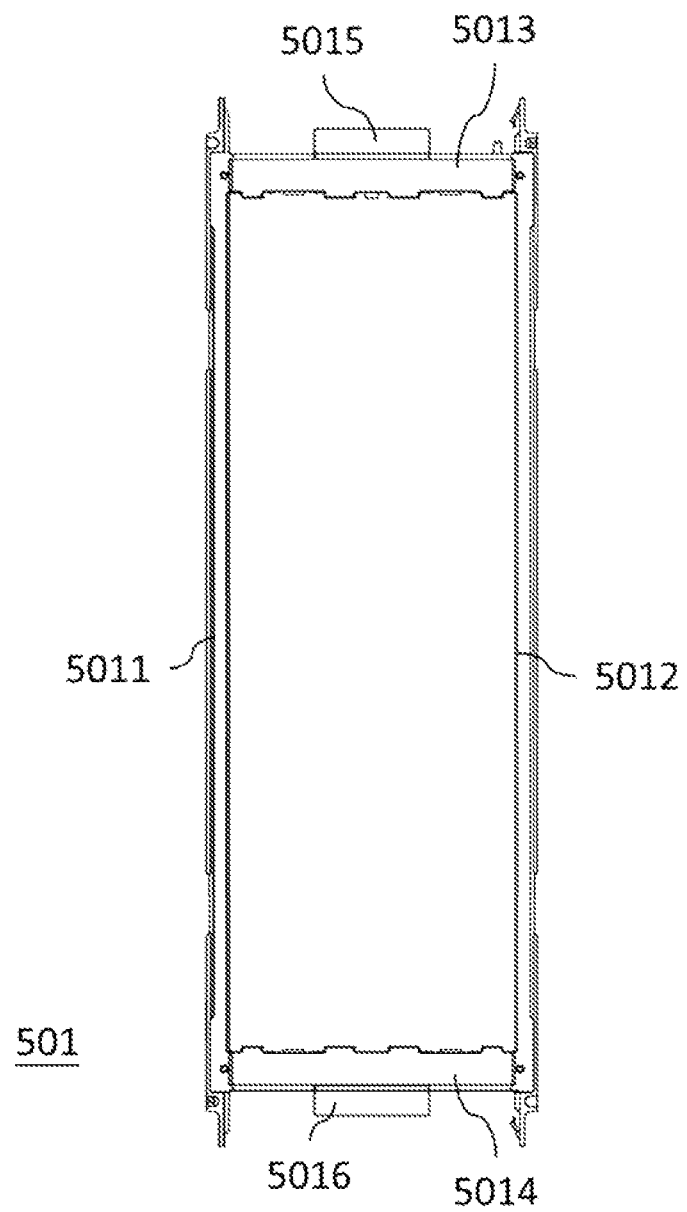
FIG. 5D is a structural top view of an intermediate frame according to some embodiments of the present application.
Figure 5E:
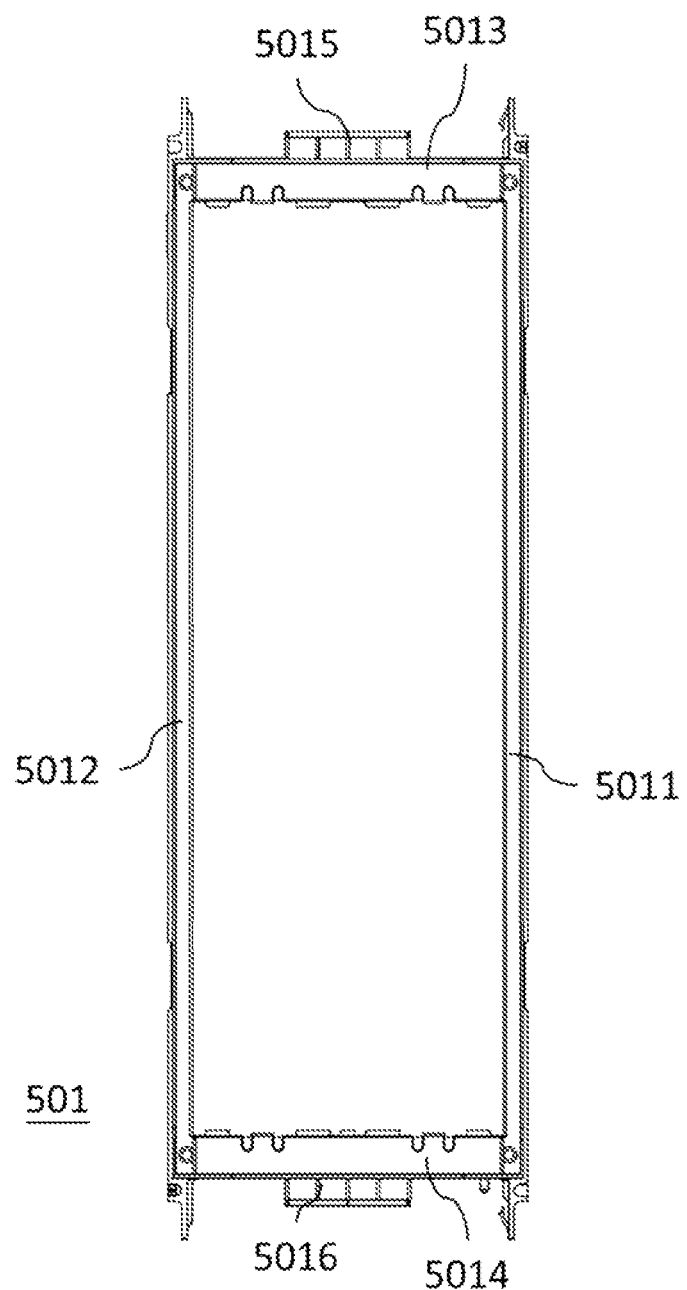
FIG. 5E is a structural bottom view of an intermediate frame according to some embodiments of the present application.

FIG. 5D and FIG. 5E are top and bottom views of an intermediate frame according to some embodiments of the present application.

As shown in FIG. 5D and FIG. 5E, the intermediate frame 501 further has a third side edge 5013 and a fourth side edge 5014 opposite to the third side edge 5013. In some embodiments, the intermediate frame 501 is provided with a first baffle plate 5015 at the third side edge 5013, and the intermediate frame 501 is provided with a second baffle plate 5016 at the fourth side edge 5014. The first baffle plate 5015 and the second baffle plate 5016 can further fix cells (not shown) disposed at two sides of the intermediate frame. The first baffle plate 5015 and the second baffle plate 5016 can be used as support members for connecting cell tabs.

Figure 5F:
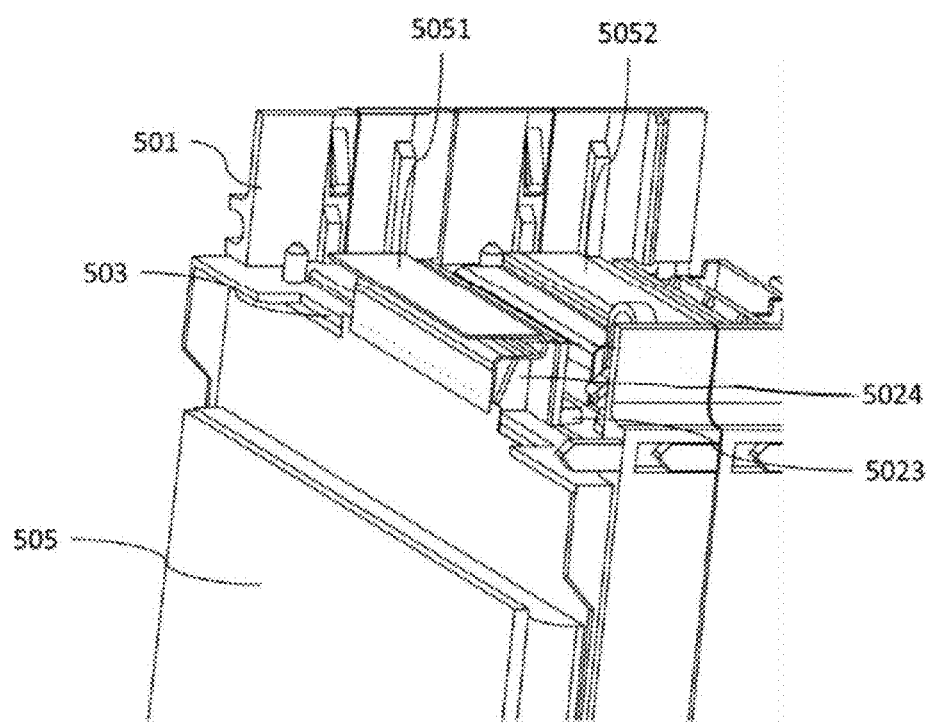
FIG. 5F is a schematic structural view of an intermediate frame and a cell according to some embodiments of the present application.

FIG. 5F is a schematic structural view of an intermediate frame and a cell according to some embodiments of the present application.

As shown in FIG. 5F, the third side edge 5013 of the intermediate frame 501 and the fourth side edge (not shown) of the adjacent intermediate frame (not shown) can define an opening 503. A cell tab 5051 of the cell 505 disposed between the intermediate frame 501 and the intermediate frame (not shown) can extend out through the opening 503.

In some embodiments, the first baffle plate 5015 is a trapezoidal structural member formed by extending from the third side edge 5013 of the intermediate frame 501. The second baffle plate 5016 is a trapezoidal structural member formed by extending from the fourth side edge 5014 of the intermediate frame 501. The first baffle plate 5015 and the second baffle plate 5016 can have a fool-proof function.

In some embodiments, the first baffle plate 5015 and the second baffle plate 5016 can provide the cell tab 5051 with a fixed attachment direction. The first baffle plate 5015 and the second baffle plate 5016 can provide a support region 5024, and the cell tab 5051 extending out from the opening 503 can be bent and fixed toward a direction perpendicular to the extending direction of the cell 505 in the support region 5024. During the assembly of the energy storage device, the first baffle plate 5015 and the second baffle plate 5016 can prevent cell tabs in different layers from wrongly connecting with each other. In some embodiments, the first baffle plate 5015 and the second baffle plate 5016 are double-layer stepped structural members. FIG. 5B inset is a magnified view of the second baffle plate 5016 in FIG. 5B and illustrates the double-layer stepped structural member of the second baffle plate 5016. In some embodiments, during the assembly of the energy storage device, the first baffle plate 5015 and the second baffle plate 5016 can separate the bent cell tab 5051 and adjacent cell tab 5052. In some embodiments, the other side of the first baffle plate 5015 and the second baffle plate 5016 also has a convex member 5023, and the convex member 5023 can control the extending direction of the cell tab 5051 extending out through the opening 503, thereby enhancing the fixation to the cell tab 5051. Those skilled in the art should understand that the first baffle plate 5015 and the second baffle plate 5016 can be selected in any suitable shape or structure according to actual needs, for example, rectangular or strip-shaped baffle plates or irregular shapes, without being limited thereto In some embodiments, the intermediate frame 501 further includes a plurality of convex members 5017. The convex members 5017 extend from the intermediate frame toward a same direction, and provide a fool-proof function during the assembly of the cell frame set. The convex members 5017 also have a function of protecting cells. As shown in FIG. 5B, the intermediate frame is provided with the convex member 5017 at an intersection of the first side edge 5011 with the third side edge 5013. The intermediate frame is provided with the convex member at an intersection of the first side edge 5011 with the fourth side edge 5014. The intermediate frame is provided with the convex member 5017 at an intersection of the second side edge 5012 with the third side edge 5013. The intermediate frame is provided with the convex member 5017 at an intersection of the second side edge 5012 with the fourth side edge 5014.

In some embodiments, the protruding structure 5018 of the intermediate frame 501 extends between the two adjacent convex members 5017. The convex member 5017 can also form a tight fit with the corresponding fitting member 5019. The tightly fitted portion can enhance the combined structural strength of the cell frame set.

In some embodiments, the intermediate frame 501 further includes a plurality of tenons 5020 and mortises 5021 corresponding to the tenons. The tenons and the mortises can provide the cell frame set with structural strength. The tenons and the mortises can enhance the fixation performance of the cell frame set. As shown in FIG. 5A, the intermediate frame is provided with the staggered tenons 5020 and the mortises 5021 corresponding to the tenons at intersections of the first side edge with the third side edge and the fourth side edge and intersections of the second side edge with the third side edge and the fourth side edge. It should be understood that different numbers and positions of tenons and corresponding mortises can be designed for the cell frame set of the present application according to actual needs without being limited thereto.

In some embodiments, the intermediate frame 501 is axisymmetric with respect to its central axis. The term "axisymmetric" herein refers to the fact that two end points of an object in a rectilinear direction that radiate perpendicular to the axis of self-symmetry are symmetrical to each other.

In some embodiments, the intermediate frame (i.e., the first frame or the second frame), the first end frame and the second end frame have identification patterns to provide a fool-proof effect during assembly. As shown in FIG. 5A and FIG. 5B, the first side edge 5011 of the intermediate frame 501 includes a first pattern 501*a* on a first surface, and the second side edge 5012 of the intermediate frame includes a second pattern 501*b* on a first surface. In some embodiments, a distance between the first pattern 501*a* of the intermediate frame 501 and the third side edge 5013 of the intermediate frame 501 is less than a distance between the first pattern 501*a* and the fourth side edge 5014. In some embodiments, a distance between the second pattern 501*b* of the intermediate frame 5012 and the third side edge 5013 of the intermediate frame 501 is greater than a distance between the second pattern 501*b* and the fourth side edge 5014.

With reference to FIG. 1, the first side edge 1011 of the first frame 101 includes a first pattern 101*a* on a first surface, and the second side edge 1012 of the first frame 101 includes a second pattern (not shown) on a first surface. The first side edge of the second frame 102 includes a first pattern (not shown) on a first surface, and the second side edge 1022 of the second frame 102 includes a second pattern 102*b* on a first surface. In some embodiments, the first pattern 101*a* of the first frame 101 and the second pattern 102*b* of the second frame 102 form a combined pattern.

With reference to FIG. 2, the first side edge 1011 of the first frame 101 includes a first pattern 101*a* on a first surface. The second side edge of the intermediate frame 103 includes a second pattern 103*b* on a first surface, and the first side edge 1012 of the second frame 102 includes a first pattern 102*a* on a first surface. In some embodiments, the first pattern 101*a* of the first frame 101 and the second pattern 103*b* of the intermediate frame 103 form a combined pattern.

With reference to FIG. 3, in some embodiments, the second side edge 1041 of the first end frame 104 further includes a third pattern (not shown) and a fourth pattern (not shown) on a first surface, and the second side edge 1052 of the second end frame 105 further includes a third pattern 105*a* and a fourth pattern 105*b* on a first surface, wherein the third pattern or the fourth pattern of the first end frame 104 can be combined with the first pattern or the second pattern of the first frame 101 to form a combined pattern, or the third pattern 105*a* or the fourth pattern 105*b* of the second end frame 105 can be combined with the first pattern 102*a* or the second pattern 102*b* of the second frame 102 to form a combined pattern to facilitate assembly.

It should be understood that although the first combined pattern in the drawing has a circular outline, those skilled in the art can adjust the form (for example, rhombus, symmetrical separated shape, irregular shape) of the combined pattern according to use needs while maintaining the effect of symmetrical identification of the present application without being limited thereto. In some embodiments, those skilled in the art can adjust the arrangement sequence and positions of the identification patterns according to a method of combining the first end frame 104, the second end frame, the first frame, the second frame and the intermediate frame to achieve the fool-proof effect without being limited thereto.

According to another aspect of the present application, the present application provides an energy storage device package including the cell frame set in the above embodiments. The energy storage package does not have metal baffle plates covering two sides, so that the weight of the energy storage package can be effectively reduced while maintaining the structural strength of the energy storage device, which facilitates transportation and disposition, the heat dissipation efficiency can be enhanced, and the energy storage package has a good dust-proof effect.

Figure 6:
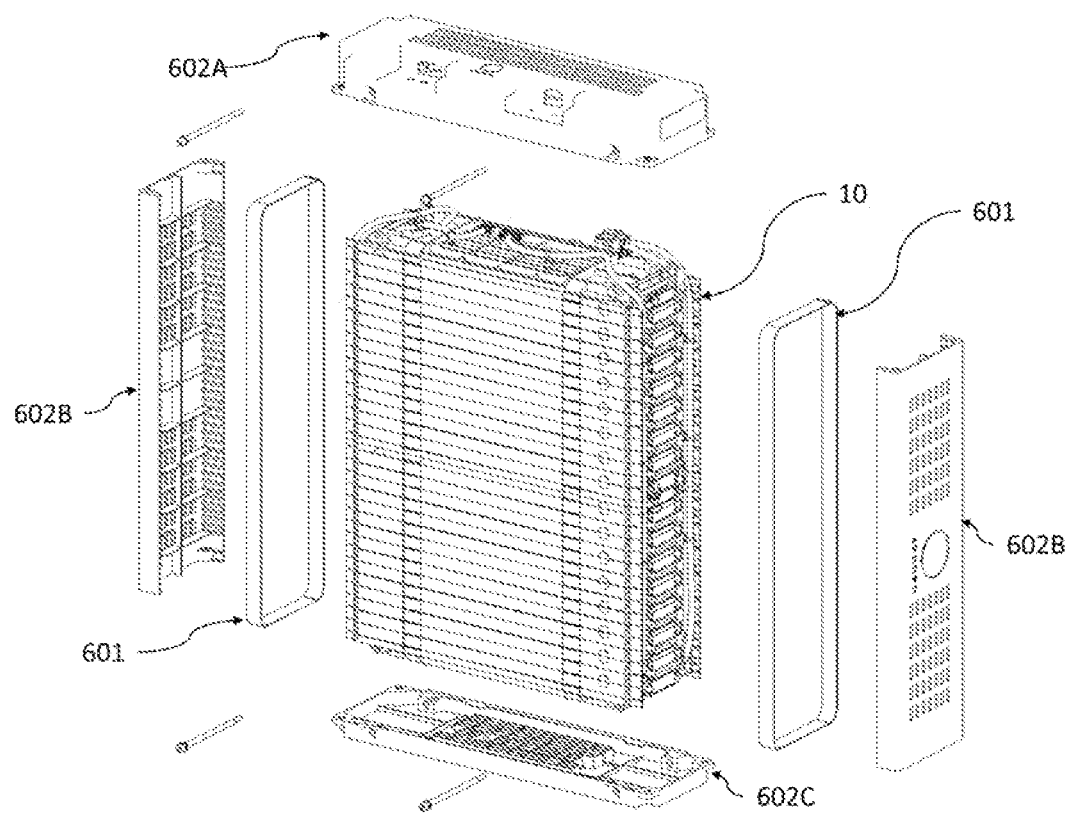
FIG. 6 is a schematic combined structural view of an energy storage device package according to some embodiments of the present application.

FIG. 6 is a schematic structural view of an energy storage package according to some embodiments of the present application.

As shown in FIG. 6, the energy storage package includes: the cell frame set 10 in the above embodiments, a fixing steel strip 601 and a package housing (602A, 602B, 602C).

In some embodiments, the package housing is a composite material, which includes a fiber material and a resin material. The fiber material is selected from the group consisting of glass fibers, carbon fibers and a combination thereof. The resin material is selected from the group consisting of an ABS resin, a PC resin, a PA66 resin and a combination thereof. By using the composite material as the package housing, the weight of the energy storage device package can be further reduced while the same structural strength can still be achieved, and the effects of impact, fall, puncture and other external forces on the energy storage device can be prevented more efficiently, thereby enhancing the protection performance on the cell frame set.

In some embodiments, the package housing includes: an upper cover 602A, a lower cover 602C and two side covers 602B. It should be understood that according to the package housing of the present application, the package housing in a specific direction can be added or removed according to actual needs without being limited thereto, for example, the package housings between the two adjacent energy storage devices can be removed when a plurality of the energy storage devices are arranged side by side, thereby saving space.

Figure 7A:
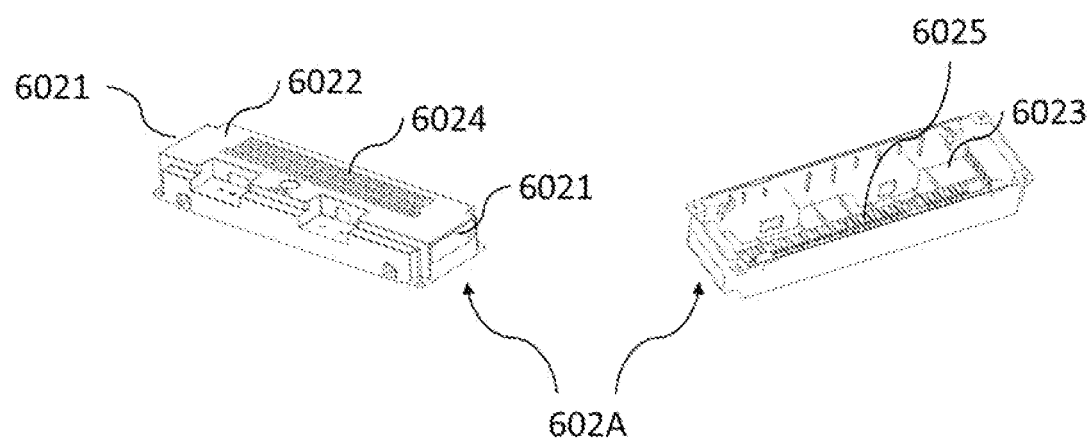
FIG. 7A is a schematic structural view of an upper cover of a package housing according to some embodiments of the present application.
Figure 7B:
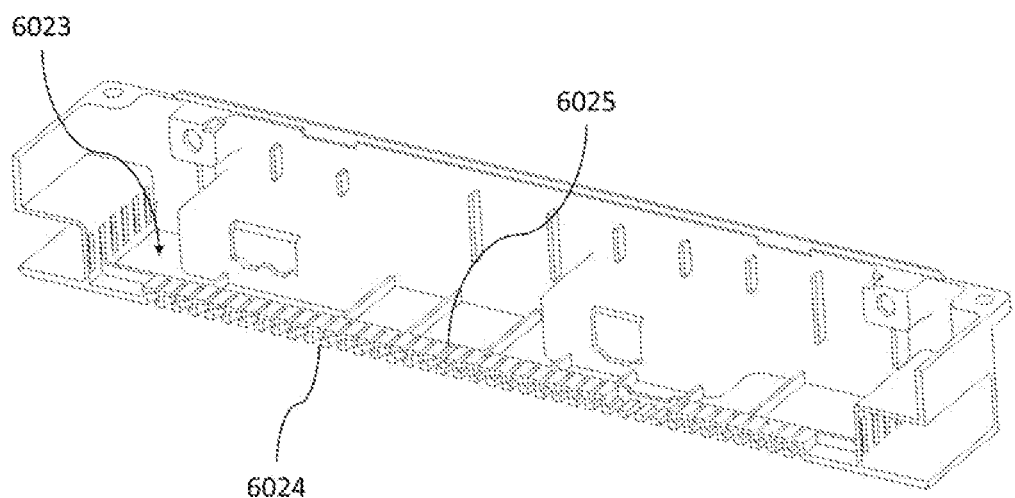
FIG. 7B is a structural cross-sectional view of an upper cover of a package housing according to some embodiments of the present application.

FIG. 7A and FIG. 7B are structural views of an upper cover of a package housing according to some embodiments of the present application.

As shown in FIG. 7A, the upper cover 602A of the package housing further includes grooves 6021 disposed at two ends thereof, thereby facilitating transportation and assembly.

As shown in FIG. 7A and FIG. 7B, the upper cover 602A of the package housing has a first surface 6022 and a second surface 6023, the first surface 6022 has a plurality of first through holes 6024, the second surface 6023 has a plurality of second through holes 6025, and the plurality of first through holes 6024 are not aligned with the plurality of second through holes 6025 in a direction perpendicular to the first surface 6022. In some embodiments, the plurality of first through holes 6024 communicate with the plurality of second through holes 6025.

In some embodiments, two sides of a channel in communication with the plurality of first through holes 6024 and the plurality of second through holes 6025 are side walls having a double-L-shaped structure, and the side walls extend toward a horizontal direction on the first surface 6022, and extend toward another horizontal direction opposite to the horizontal direction on the second surface 6023. By disposing the above through holes, dust or particles can be further prevented from entering the energy storage device package while maintaining high heat dissipation efficiency.

Figure 8:
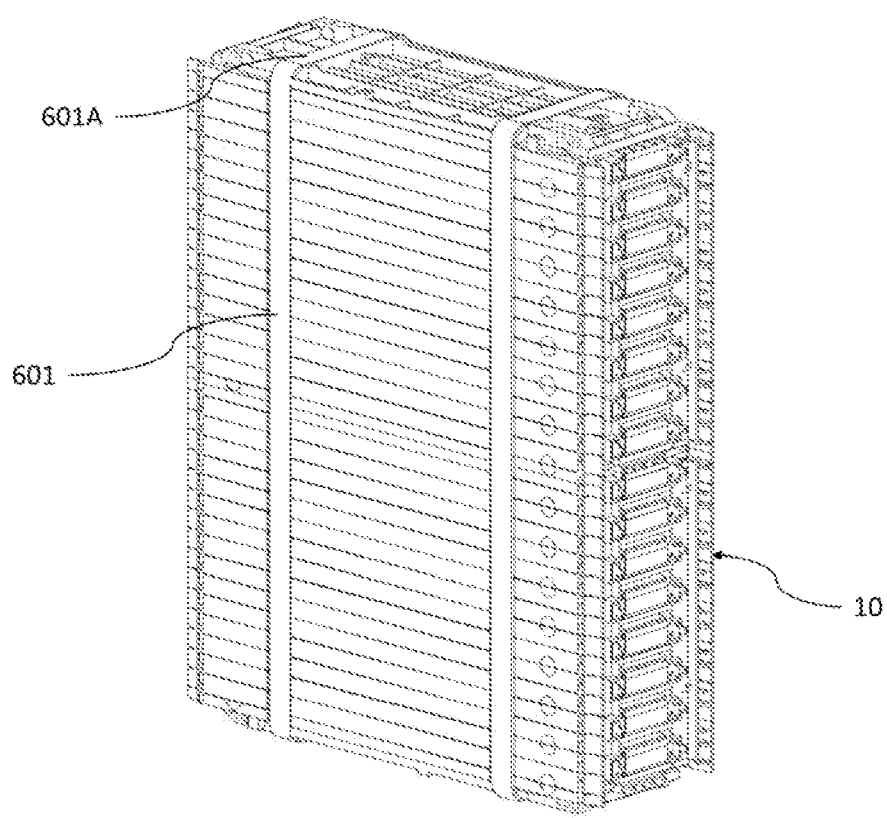
FIG. 8 is a schematic combined structural view of a cell structure and a fixing steel strip according to some embodiments of the present application.

FIG. 8 is a schematic structural view of a cell frame set and a fixing steel strip according to some embodiments of the present application.

As shown in FIG. 8, the fixing steel strip 601 surrounds and fixes the cell frame set 10. In some embodiments, the package further includes an insulating member 601A. In some embodiments, the insulating member 601A may cover a first portion of the fixing steel strip 601 and expose a second portion of the fixing steel strip. In some embodiments, the insulating member 601A may completely cover the fixing steel strip 601. In some embodiments, the insulating member 601A can effectively insulate and isolate at least a part of the contact portion of the fixing steel strip 601 and the cell frame set 10. It should be understood that the material of the insulating member may be any insulating material known in the art, for example, a thermoplastic material or a ceramic material, without being limited thereto. A shape of the insulating member may include, but not limited to, a sleeve or a gasket.

The fixing steel strip 601 can fasten the upper cover 602A, the lower cover 602C, and a plurality of intermediate frames and end frames stacked on each other.

By assembling the peripheral frames and the cell frame set, the energy storage device package provided by the present disclosure breaks through the limitations in the mass and external volume of the traditional metal plate housing, and can achieve the lightweight design of the structure. The energy storage device package provided by the present disclosure can also meet the use conditions of protection rating IP20.

According to another aspect of the present application, the present application further provides a method of disposing a cell frame set and an energy storage device package: by using the cell frame set as a cell carrier, a cell is disposed in the cell frame set and fixed, and an energy storage device module is constructed by stacking frames. After stacking, squeezing equipment is used to apply pressure to the module for compression, a steel strip is sleeved from two sides of the energy storage device module in the compressed state, and after the steel strip is sleeved to the designated position, the applied pressure is slowly reduced such that the steel strip is restored to a tightened state, thereby fixing the energy storage device module. Then, the energy storage device module is combined and fixed with the package housing through a combining member.

In some embodiments, the combining member may be any combining member commonly used in the art, for example, but not limited to, bolts, adhesives, and coats.

Based on the above, the present application provides the cell frame set and the energy storage device package including the cell frame set. By improving the structure, the cell frame set and the energy storage device package of the embodiments of the present application can greatly enhance the heat dissipation efficiency of the energy storage device while reducing its weight. In addition, the cell frame set and the energy storage device package of the present application provide settings that can adjust the number of cells, configuration and power output, and can provide users with a more flexible and customized energy storage device module. At the same time, the energy storage device package of the present application also has many advantages, such as easy assembly, convenient transportation and low preparation cost.

As used in the present application, terms "approximately", "substantially", "essentially", and "about" are used for describing and explaining a small variation. When being used in combination with an event or circumstance, the terms may refer to an example in which the event or circumstance occurs precisely, and an example in which the event or circumstance occurs approximately. For example, when being used in combination with a value, the terms may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if the difference between two numerical values is less than or equal to ±10% of the average of the values (e.g., less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two values may be considered "about" the same.

In the present application, unless otherwise particularly indicated or limited, relativistic wordings such as "central", "longitudinal", "lateral", "front", "back", "right", "left", "inner", "outer", "relatively low", "relatively high", "horizontal", "vertical", "higher than", "lower than", "above", "below", "top", "bottom", and their derived wordings (such as "horizontally", "downward", and "upward") should be construed as referenced directions described in the description or shown in the appended drawings. These relativistic wordings are merely used for ease of description, and do not require constructing or operating the present application in a specific direction.

Further, to facilitate description, "first", "second", "third", "fourth", and the like may be used in the present application to distinguish among different components in a diagram or a series of diagrams. The wordings "first", "second", "third", "fourth", and the like are not intended to describe corresponding components.

In the present application, unless particularly specified or defined, "dispose," "connect," "set," "fix," and similar wordings are widely used, and a person skilled in the art can understand, according to specific situations, that the above-described wordings may indicate, for example, a fixed connection, a detachable connection, or an integrated connection, alternatively, the wordings may indicate a mechanical connection or an electrical connection, and alternatively, the wordings may also indicate a direct link or an indirect link through an intermediary structure.

In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or sub-ranges within the ranges, like explicitly specifying each value and each sub-range.

References throughout the specification to "some embodiments," "partial embodiments," "one embodiment," "another example," "example," "specific example" or "partial examples" mean that at least one embodiment or example of the application comprises specific features, structures, materials or characteristics described in the embodiments or examples. Thus, the descriptions appearing throughout the specification, such as "in some embodiments," "in an embodiment," "in one embodiment," "in another example," "in an example," "in a particular example" or "for example," are not necessarily the same embodiment or example in the application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. A cell frame set for a cell, comprising:
a first frame having a first side edge of the first frame and a second side edge of the first frame opposite to the first side edge of the first frame, wherein the first side edge of the first frame and the second side edge of the first frame are provided with protruding structures; and
a second frame having a first side edge of the second frame and a second side edge of the second frame opposite to the first side edge of the second frame, wherein the first side edge of the second frame and the second side edge of the second frame are provided with fitting structures,
wherein,
the protruding structures of the first frame form a fit with the fitting structures of the second frame;
the first frame further comprises a third side edge of the first frame and a fourth side edge of the first frame opposite to the third side edge of the first frame, the first frame is provided with a first baffle plate at the third side edge of the first frame;
the first baffle plate comprises a two-layer stepped structure with a support region;
the cell frame set is configured to structurally support the cell such that:
the cell extends in a first direction from the third side edge of the first frame to the fourth side edge of the first frame; and
the support region supports a cell tab of the cell, wherein the cell tab rests on the support region of the two-stepped layer structure and has a first bend in a second direction perpendicular to the first direction and has a second bend in a third direction opposite to the second direction, such that the bent cell tab forms a U shape; and
the first baffle plate separates bent cell tabs of adjacent layers of cells from each other.

2. The cell frame set according to claim 1, wherein the first frame is provided with a second baffle plate at the fourth side edge.

3. The cell frame set according to claim 2, wherein the second baffle plate is a double-layer stepped structural member.

4. The cell frame set according to claim 1, wherein the first frame is provided with convex structures at intersections of (i) the first side edge of the first frame, (ii) the third side edge of the first frame, and (iii) the fourth side edge of the first frame; and at intersections of (1) the second side edge of the first frame, (2) the third side edge of the first frame, and (3) the fourth side edge of the first frame.

5. The cell frame set according to claim 1, wherein two sides of the U shape are perpendicular to the first direction.

6. A cell frame set for a cell, comprising:
a first frame having a first side edge of the first frame and a second side edge of the first frame opposite to the first side edge of the first frame, wherein the first side edge of the first frame and the second side edge of the first frame are provided with protruding structures;
a second frame having a first side edge of the second frame and a second side edge of the second frame opposite to the first side edge of the second frame, wherein the first side edge of the second frame and the second side edge of the second frame are provided with fitting structures;
at least one intermediate frame disposed between the first frame and the second frame, each of the at least one intermediate frame having a first side edge and a second side edge opposite to the first side edge, wherein the first side edge and the second side edge of the each of the at least one intermediate frame are provided with a protruding structure and a fitting structure corresponding to the protruding structure;
the protruding structure of one intermediate frame forms a fit with the fitting structure of the second frame, the fitting structure of the one intermediate frame or another intermediate frame forms a fit with the protruding structure of the first frame;
the first frame further comprises a third side edge of the first frame and a fourth side edge of the first frame opposite to the third side edge of the first frame, the first frame is provided with a first baffle plate at the third side edge of the first frame;
the first baffle plate comprises a two-layer stepped structure with a support region;
the cell extends in a first direction from the third side edge of the first frame to the fourth side edge of the first frame;
the support region supports a cell tab of the cell, wherein the cell tab rests on the support region of the two-stepped layer structure and has a first bend in a second direction perpendicular to the first direction and has a second bend in a third direction opposite to the second direction, such that the bent cell tab forms a U shape; and
the first baffle plate separates bent cell tabs of adjacent layers of cells from each other.

7. The cell frame set according to claim 6, wherein the first frame is provided with a second baffle plate at the fourth side edge.

8. The cell frame set according to claim 6, wherein the first side edge of the intermediate frame is correspondingly combined with the second side edge of the adjacent intermediate frame.

9. The cell frame set according to claim 6, wherein:
the first frame is provided with convex structures at intersections of (i) the first side edge of the first frame, (ii) the third side edge of the first frame, and (iii) the fourth side edge of the first frame; and
the first frame is provided with the convex structures at intersections of (1) the second side edge of the first frame, (2) the third side edge of the first frame, and (3) the fourth side edge of the first frame.

10. The cell frame set according to claim 6, wherein the first side edge of the intermediate frame comprises a first pattern on a first surface, and the second side edge of the intermediate frame comprises a second pattern on a first surface, wherein the first pattern and the second pattern have a fool-proof function.

11. The cell frame set according to claim 6, wherein two sides of the U shape are perpendicular to the first direction.

12. An energy storage device package, comprising:
a fixing steel strip;
a package housing; and a cell frame set for a cell, comprising:

a first frame having a first side edge of the first frame and a second side edge of the first frame opposite to the first side edge of the first frame, wherein the first side edge of the first frame and the second side edge of the first frame are provided with protruding structures; and a second frame having a first side edge of the second frame and a second side edge of the second frame opposite to the first side edge of the second frame, wherein the first side edge of the second frame and the second side edge of the second frame are provided with fitting structures, wherein, the protruding structures of the first frame form a fit with the fitting structures of the second frame;

the first frame further comprises a third side edge of the first frame and a fourth side edge of the first frame opposite to the third side edge of the first frame, the first frame is provided with a first baffle plate at the third side edge of the first frame;

the first baffle plate comprises a two-layer stepped structure with a support region;

the cell frame set is configured to structurally support the cell such that:

the cell extends in a first direction from the third side edge of the first frame to the fourth side edge of the first frame; and the support region supports a cell tab of the cell, wherein the cell tab rests on the support region of the two-stepped layer structure and has a first bend in a second direction perpendicular to the first direction and has a second bend in a third direction opposite to the second direction, such that the bent cell tab forms a U shape; and the first baffle plate separates bent cell tabs of adjacent layers of cells from each other; and wherein the fixing steel strip surrounds and fixes the cell frame set, and the package housing covers the fixed cell frame set.

13. The energy storage device package according to claim 12, wherein the package housing comprises a fiber material and a resin material, wherein the fiber material is selected from the group consisting of glass fibers, carbon fibers and a combination thereof, and the resin material is selected from the group consisting of an ABS resin, a PC resin, a PA66 resin and a combination thereof.

14. The energy storage device package according to claim 12, wherein the package housing comprises an upper cover, a lower cover and two side covers, wherein the upper cover further comprises grooves disposed at two ends thereof.

15. The energy storage device package according to claim 14, wherein the upper cover has a first surface and a second surface, the first surface has a plurality of first through holes, the second surface has a plurality of second through holes, and the plurality of first through holes are not aligned with the plurality of second through holes in a direction perpendicular to the first surface.

16. The energy storage device package according to claim 12, further comprising: an insulator, wherein the insulator covers a first portion of the fixing steel strip and exposes a second portion of the fixing steel strip.

17. The energy storage device package according to claim 12, further comprising:

a cell, wherein:

the first baffle plate provides a support region such that a cell tab of the cell is bent in a direction perpendicular to an extending direction of the cell in the support region.

* * * * *